(12) United States Patent
Barany et al.

(10) Patent No.: US 7,072,336 B2
(45) Date of Patent: Jul. 4, 2006

(54) COMMUNICATIONS USING ADAPTIVE MULTI-RATE CODECS

(75) Inventors: Peter A. Barany, McKinney, TX (US);
Jayshree A. Bharatia, Plano, TX (US);
Chandra Sekhar Bontu, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1025 days.

(21) Appl. No.: 09/848,902

(22) Filed: May 4, 2001

(65) Prior Publication Data

US 2003/0189900 A1 Oct. 9, 2003

Related U.S. Application Data

(60) Provisional application No. 60/207,622, filed on May 26, 2000.

(51) Int. Cl.
*H04L 12/28* (2006.01)

(52) U.S. Cl. .................. 370/389; 370/395.21

(58) Field of Classification Search ............. 370/349, 370/389, 352–356, 392, 471, 395.21, 395.64, 370/474, 395.41, 395.42, 395.52, 232, 332; 358/539
See application file for complete search history.

(56) References Cited

U.S. PATENT DOCUMENTS 5,231,492 A * 7/1993 Dangi et al. ............. 348/14.12
5,537,410 A 7/1996 Li
6,434,139 B1 * 8/2002 Liu et al. .................. 370/352
6,757,823 B1 * 6/2004 Rao et al. .................. 713/153

FOREIGN PATENT DOCUMENTS

WO    WO 00/56001    9/2000

OTHER PUBLICATIONS

Information Science Institute, *Internet Protocol, Darpa Internet Program Protocol Specification*, RFC 791, pp. 1-44 (Sep. 1981).
S. Deering, Network Working Group Request for Comments: 2460, *Internet Protocol, Version 6 (IPv6) Specification*, pp. 1-33 (Dec. 1998).

(Continued)

*Primary Examiner*—Wellington Chin
*Assistant Examiner*—Brenda Pham
(74) *Attorney, Agent, or Firm*—Trop, Pruner & Hu, PC (57) ABSTRACT

A communications network includes a data network that is coupled to a wireless access network and other devices. The wireless access network enables access by mobile stations of the data network. Each mobile station, and optionally, one or more of other devices coupled to the data network, contains an adaptive multi-rate codec (coder/decoder) that can be set to operate at a plurality of rates. Based on the selected one of the plurality of rates, the mobile station or other device sets a quality-of-service (QoS) indicator value in a packet carrying data, such as real-time data, over the wireless access network and/or data network. By varying QoS requirements using the QoS indicator value for different codec rates, bandwidth requirements are varied so that more efficient usage of the data network is provided.

21 Claims, 5 Drawing Sheets

OTHER PUBLICATIONS

R. Braden, Ed., Network Working Group Request for Comments: 2205, *Resource Reservation Protocol (RSVP)*, pp. 1-94 (Sep. 1997).

K. Nichols, Network Working Group Request for Comments: 2474, *Definition of the Differentiated Services Field (DS Field) in the IPv4 and Ipv6 Headers*, pp. 1-17 (Dec. 1998).

S. Blake, Network Working Group Request for Comments: 2475, *An Architecture for Differentiated Services*, pp. 1-31 (Dec. 1998).

H. Schulzrinne, Network Working Group Request for Comments: 1889, *RTP: A Transport Protocol for Real-Time Applications*, pp. 1-60 (Jan. 1996).

F. Baker, Network Working Group Request for Comments: 1812, *Requirements for IP Version 4 Routers*, pp. 1-147 (Jun. 1995).

J. Heinanen, Network Working Group Request for Comments: 2597, *Assured Forwarding PHB Group*, pp. 1-10 (Jun. 1999).

V. Jacobson, Network Working Group Request for Comments: 2598, *An Expedited Forwarding PHB*, pp. 1-10 (Jun. 1999).

D. Durham, Network Working Group Request for Comments: 2748, *The COPS (Common Open Policy Service) Protocol*, pp. 1-32 (Jan. 2000).

R. Yavatkar, Network Working Group Request for Comments: 2753, *A Framework for Policy-Based Admission Control*, pp. 1-17 (Jan. 2000).

Cline et al., *DirectShow™ RTP Support for Adaptivity in Networked Multimedia Applications*, Multimedia Computing and Systems, 1998. IEEE International Conference, Austin, TX, Jun. 28, 1998, pp. 13-22.

* cited by examiner

COMMUNICATIONS USING ADAPTIVE MULTI-RATE CODECS

CROSS-REFERENCE TO RELATED APPLICATION

This claims the benefit under 35 U.S.C. § 119(e) of U.S. Provisional Application Ser. No. 60/207,622, filed May 26, 2000.

TECHNICAL FIELD

The invention relates generally to communications using adaptive multi-rate codecs.

BACKGROUND

Packet-based data networks are widely used to link various types of network elements, such as personal computers, servers, network telephones, Internet appliances, and so forth. Examples of data networks include private networks (such as local area networks or wide area networks) and public networks (such as the Internet). Common forms of communications between network elements across packet-based data networks include electronic mail, file transfer, web browsing, and other exchanges of data. More recently, with the increased capacity and reliability of packet-based data networks, audio communications (such as voice communications), video communications (such as video conferencing), and other forms of real-time interactive or streaming communications are becoming more common over packet-based data networks.

With advancements in wireless communications networks, efficient packet-based communications over wireless networks have also become possible. Traditionally, wireless communications networks have been implemented as circuit-switched networks. In a circuit-switched network, a channel between two end points (e.g., two mobile units) is occupied for the duration of the connection between the end points. Such a connection is optimal for communications that are relatively continuous, such as speech. However, circuit-switched networks are not very efficient for packet-based communications such as e-mail, web browsing, and the like.

Several packet-based wireless protocols have been proposed to provide more efficient connections between a mobile station and a packet-based data network, such as an Internet Protocol (IP) network. One such protocol is the General Packet Radio Service (GPRS) protocol, which complements existing GSM (Global System for Mobile) communications systems. Other technologies that build upon GPRS are the Enhanced GPRS (EGPRS) technology (also referred to as Enhanced Data Rate for Global Evolution or EDGE) and EGPRS COMPACT (or EDGE COMPACT) technology, which offer higher data rates and complement GSM and IS-136 systems. Another type of wireless network that can support efficient packet-based communications is a UMTS (Universal Mobile Telecommunication System) wireless network, which is based on the Wideband Code-Division Multiple Access (W-CDMA) protocol.

Voice and other forms of real-time, interactive communications over a packet-based network (wired or wireless) are sensitive to delays in, or loss of, packets. Depending upon the level of use, packet delays and rate of packet loss can vary widely in a packet-based network. Voice packets that are lost or delayed due to inadequate or unavailable capacity of a packet-based network (wired or wireless) may result in gaps, silence, and clipping of audio at the receiving end.

To ensure some level of quality of certain types of communications, such as voice or other real-time, interactive communications, quality-of-service (QoS) mechanisms can be implemented. Certain types of traffic, such as electronic mail or web browsing traffic, have relatively low QoS requirements (that is, such communications are more tolerant of transport delays and loss of packets), whereas voice and other real-time, interactive communications have relatively high QoS requirements.

However, allocation of excessive resources to voice or other real-time, interactive communications may cause performance of other types of communications to suffer, such as electronic mail or web browsing communications. On the other hand, allocating too little resources to real-time, interactive communications may cause reduced performance of such communications. As a result, a need continues to exist for a method and apparatus for balancing the needs of communications with high QoS requirements, such as real-time, interactive communications, with needs of other types of communications over a shared transport medium.

SUMMARY

In general, according to one embodiment, a method of communications comprises determining one of plural rates to code data for communication over a network and encapsulating the data in a packet having a quality-of-service indicator field. One of plural values is set for the quality-of-service indicator field based on the determined one of plural rates.

Some embodiments of the invention may have one or more of the following advantages. More efficient provisioning of resources of a packet-based network, wired or wireless, based on quality-of-service requirements can be provided for communications of different types of traffic (e.g., voice traffic, best-effort traffic, etc.). By adjusting quality-of-service requirements based on criteria such as the rate of audio data coding, more efficient usage of the packet-based network can be achieved since resources that are not needed are not allocated. By more efficiently using resources of a shared transport medium, the effective bandwidth for all traffic on the shared transport medium can be increased.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
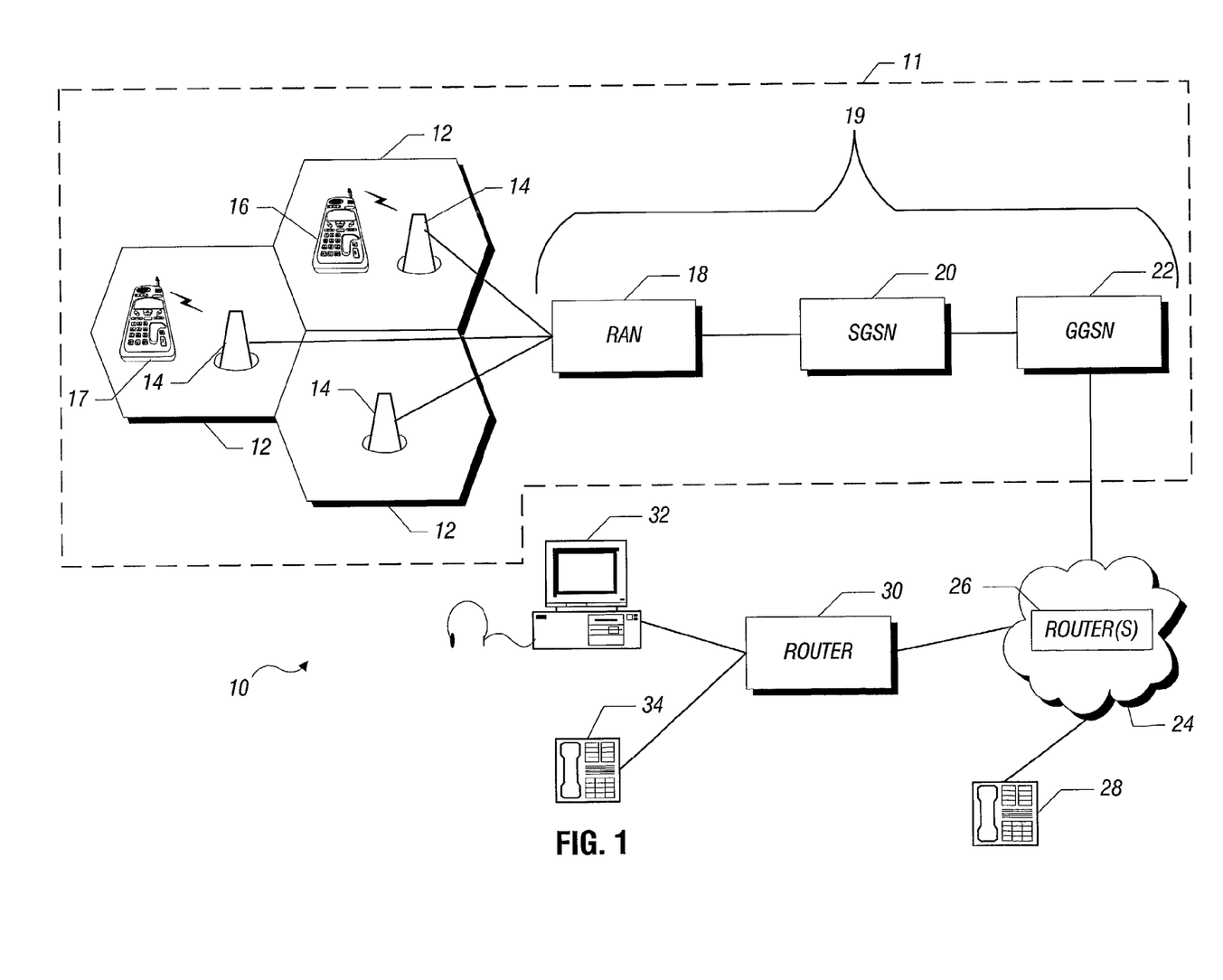
FIG. 1 is a block diagram of an embodiment of the communications system.

Referring to FIG. 1, a communications network 10 includes a packet-based data network 24 that is coupled to various devices and systems to enable communications between those devices and systems. One system that is coupled to the network 24 is a wireless communications system 11, which is made up of elements to enable communications between mobile stations 16, 17, and the network 24. The wireless communications system 11 includes a number of cells 12, each associated with a base station 14. Each base station 14 communicates with a mobile station 16 or 17 over a wireless link. Examples of the mobile stations 16, 17 include mobile telephones, mobile computers, personal digital assistants, and so forth.

The base stations 14 are coupled to one or more radio access network (RAN) controllers 18. For example, the RAN controllers 18 may be base station controllers (BSCs) or other types of controllers. In one embodiment, the RAN controller 18 is coupled to a serving GPRS (General Packet Radio Service) support node (SGSN) 20. The SGSN 20 controls the establishment, processing, and termination of packet-based communications with mobile stations 16, 17. The SGSN 20 is coupled to a gateway GPRS support node (GGSN) 22, which acts as the gateway between the wireless communications system 11 and the packet-based network 24. Collectively, the RAN controller 18, SGSN 20, and GGSN 22 are referred to as a "wireless access network 19."

The SGSN 20 and GGSN 22 behave according to either the EGPRS (Enhanced GRPS) or EGPRS COMPACT protocols. Alternatively, operation of the SGSN 20 and GGSN 22 can be according to the UMTS (Universal Mobile Telecommunication System) standard.

In addition to conventional data services, such as electronic mail, web browsing, file transfer and so forth, that are available over the network 24, voice and other forms of real-time data communications (e.g., audio/video streaming, audio/video interactive calls, etc.) are also possible over the network 24. Devices that can be coupled to the network 24 include a network telephone 28, such as the i2004 telephone from Nortel Networks Limited. A router 30 can also be coupled to the network 24, with the router 30 coupled to plural devices, including a computer 32 (with voice processing capabilities) and a network telephone 34. For example, the computer 32 can be running the i2050 application to enable telephony communications over a packet-based network. A computer so configured can be referred to as a "softphone."

The packet-based network 24 is made up of one or more interconnected routers 26. These routers are used to route data from a source to a destination based on address information carried in data packets. Such packets may be according to the Internet Protocol (IP), which is described in Request for Comments (RFC) 791, entitled "Internet Protocol," dated September 1981. This version of IP is referred to as IPv4. Another version of IP is IPv6, which is described in RFC 2460, entitled "Internet Protocol, Version 6 (IPv6) Specification," dated December 1998.

IP provides for packet-switched communications over the network 24. Unlike circuit-switched networks, which provide a dedicated end-to-end channel portion (e.g., a time slot) for the duration of a call session, a packet-switched network is based on a connectionless internetwork layer. Packets or other units of data injected into a packet-switched data network may travel independently over any path (and possibly over different paths) to a destination point. The packets may even arrive out of order.

While IP defines a connectionless, packet-based network, another type of packet-based network is the connection-oriented, packet-based network, such as Asynchronous Transfer Mode (ATM) or Frame Relay networks. In an alternative embodiment, the data network 24 can also be a connection-oriented, packet-based network.

One of the concerns associated with the use of a shared transport medium is contention between different data flows for the shared transport medium. Certain types of data communications are delay tolerant (such as electronic mail and web browsing), while other types of communications are not (such as voice or other real-time communications). In the example of FIG. 1, each of the network 24 and the wireless access network 19 is a shared transport medium. The wireless access network 19 is shared by multiple mobile stations. The network 24 is shared by mobile stations in the wireless communications system 11 as well as all other network devices coupled (directly or indirectly) to the network 24. As network traffic increases, congestion in a shared transport medium can cause an increase in packet delay and loss of packets. To assure high quality and reliable communications, quality-of-service (QoS) requirements can be provisioned for communications sessions so that resources of the shared transport medium can be allocated for each communications session.

QoS can be set according to different models: a differentiated services (Diff-Serv) model) or an integrated services (Int-Serv model). Diff-Serv is described in RFC 2474, entitled "Definition of the Differentiated Services Field (DS Field) in the IPv4 and IPv6 Headers," dated December 1998; and RFC 2475, entitled "An Architecture for Differentiated Services," dated December 1998. The Int-Serv model is based on the Resource Reservation Protocol (RSVP), which is described in RFC 2205, entitled "Resource Reservation Protocol (RSVP)," dated September 1997.

One of the features of some user devices, such as mobile stations 16, 17, network telephones 28, 34, and the softphone 32, is the ability to vary the rate at which real-time data (e.g., voice data) is coded and encoded. As used here, "real-time data" refers to either audio data and/or video data that is communicated in a stream to a receiving device. "Real-time, interactive" data or traffic refers to audio and/or video data that is exchanged between devices in an interactive session, such as a call session.

Varying the coding rate of real-time data can be accomplished by use of adaptive multi-rate coder/encoders (co-decs). In the mobile context, as a mobile station moves closer to a base station 14, a higher audio codec rate can be set (so that a larger quantity of voice data can be processed). This is possible due to radio frequency (RF) signals increasing in strength as mobile stations move closer to the base station, thereby making it possible to use less robust forward error correction, which in turn makes it possible to use a higher codec rate. However, as a mobile station moves away from a base station to the edges of a cell 12, a lower codec rate is used (since weaker RF signals require more processing/forward error correction). The codec rate can also be varied for user devices connected to a wired network. Although reference is made to audio codecs in the described embodiments, it is noted that other embodiments may employ video codecs having varying coding/decoding rates.

As the codec rate varies, the amount of data that is placed into a given packet also varies. A higher codec rate implies a greater amount of data in a packet, while a lower codec rate implies a lower amount of data. Thus, in accordance with some embodiments, as the codec rate varies the QoS requirement for the data flow generated by the codec is also varied. When the codec rate decreases, the amount of data in each packet also decreases. Accordingly, the amount of bandwidth (or peak throughput) needed to communicate the packets of reduced size is also decreased. Thus, if a first codec rate is used, a first QoS requirement is requested; if a second codec rate is used, a second QoS requirement is requested; and so forth. By varying the QoS requirements as codec rates change, more efficient usage of the shared transport media 19 and 24 can be achieved. When a user device requests a lower QoS requirement because of a lower codec rate, then a greater amount of bandwidth of the shared transport media 19 and 24 becomes available for other data flows or sessions. Thus, by varying QoS requirements with varying codec rates, "statistical multiplexing" of real-time interactive traffic (e.g., voice traffic) can be achieved with other types of traffic, as explained further below.

For purposes of this discussion, there are two types of adaptive multi-rate (AMR) codecs: an AMR narrowband (AMR-NB) codec and an AMR wideband (AMR-WB) codec. Note, however, that there may also be other types of AMR codecs. In one example, an AMR-NB codec performs eight-kilohertz (kHz) sampling, while an AMR-WB codec performs 16-kHz sampling. In one embodiment, an AMR-NB codec has nine modes of operation, which corresponds to nine different codec rates (rate of coding/decoding): 12.2 kilobits per second (kbps), 10.2 kbps, 7.95 kbps, 7.40 kbps, 6.70 kbps, 5.90 kbps, 5.15 kbps, 4.75 kbps, and SID (which represents the rate of coding/decoding when there is silence—no voice data is being communicated). Also, according to one example, an AMR-WB codec has ten modes of operation corresponding to ten different codec rates: 23.85 kbps, 23.05 kbps, 19.85 kbps, 18.25 kbps, 15.85 kbps, 14.25 kbps, 12.65 kbps, 8.85 kbps, 6.6 kbps, and SID. The various codec rates given above are provided as examples only, as other codec rates can be used in other embodiments.

Figure 2:
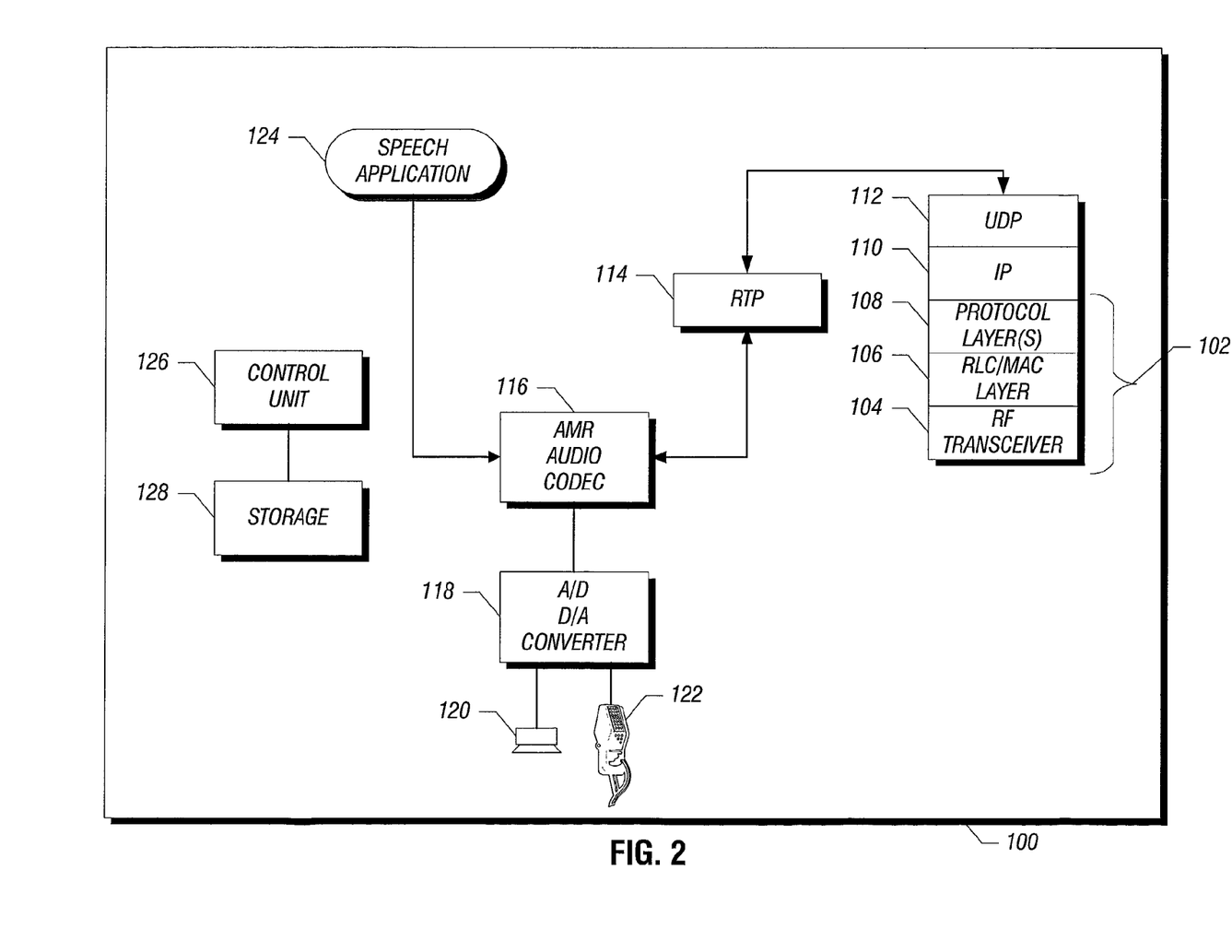
FIG. 2 is a block diagram components of a user device or system for use in the communications network of FIG. 1.

Referring to FIG. 2, example components of a user device 100 are illustrated. The user device 100 can be any one of the mobile stations 16, 17, network telephones 34, and softphone 32. The user device 100 includes a network interface 102, which for a mobile station includes a RF transceiver 104, a radio link control/medium access control (RLC/MAC) layer 106, and other protocol layers 108, e.g., Packet Data Convergence Protocol (PDCP) for UMTS. In the alternative, for a user device that is coupled to a wired network (e.g., IEEE 802.3 Ethernet), the network interface 102 typically includes a network adapter, such as an Ethernet adapter (which does not require an RLC layer, only a MAC layer and a physical layer below the MAC layer. Above the network interface 102 is an IP layer 110, which encapsulates outbound data into IP packets and extracts payload data from inbound IP packets. A transport layer 112 is provided above the IP layer 110 with one example of the transport layer being according to the User Datagram Protocol (UDP). UDP is described in RFC 768, entitled "User Datagram Protocol," dated August 1980.

A Real-Time Protocol (RTP) module 114 is also provided in the user device 100. RTP is describe in RFC 1889, entitled "RTP: A Transport Protocol for Real-Time Applications," dated January 1996. RTP defines end-to-end transport functions that are suitable for real-time data, such as audio, video, or other data. The RTP module 114 encapsulates outbound real-time data into RTP packets, and extracts real-time data from inbound RTP packets. The RTP module 114 is coupled to an AMR audio codec 116, which codes and decodes audio data according to one of plural rates. The coding/decoding rate of the AMR codec 116 can be varied by an application (e.g., a speech application 124) running in the user device 100.

In the outbound direction, the codec 116 synthesizes or codes data, with the coded data placed into the payload section of an RTP packet by the RTP module 114. On the receive side, extracted payload from an RTP packet is decoded by the codec 116. The AMR audio codec 116 is coupled to an analog-to-digital (A/D) and digital-to-analog (D/A) converter 118, which converts between analog and digital audio signals. Audio signals are output through a speaker 120 by the converter 118, and input audio signals are received from a microphone 122.

The speech application 124, as well as other software routines or modules in the user device 100, are executable on one or more control units 126 that are coupled to a storage 128.

An RTP packet has a header portion and a payload section, with the payload section carrying audio data coded by the AMR audio codec 116 (or codecs associated with other real-time data). In the examples discussed here, it is assumed that the user device 100 communicates voice data. However, in other applications, other types of real-time data can be communicated. Further along the outbound direction, the RTP packet is encapsulated into a UDP packet, which contains a UDP header and a payload section. The payload section of the UDP packet carries the RTP packet. The UDP packet is in turn encapsulated into an IP packet, which contains an IP header and a payload section. Each of the headers associated with the IP packet, UDP packet, and RTP packet has a predetermined size as defined by the different protocols (although each of the headers can be compressed to a variable smaller size using, for example, Robust Header Compression (ROHC) as defined in RFC 3095).

As the codec rate varies, the length of the RTP payload also varies. A higher codec rate implies a larger RTP payload length, as shown in Tables 1 and 2 below. Table 1 shows the RTP payload length for different AMR-NB codec rates, and Table 2 shows the RTP payload length for different AMR-WB codec rates. The values provided in Tables 1 and 2 are by way of example only, and are not intended to limit the scope of the invention. The RTP payload length includes the data portion as well as an octet 0 (which is the first octet of the RTP payload section).

TABLE 1

AMR-NB

| AMR-NB Speech Codec Mode (kbps) | RTP Payload Format Length Including Octet 0 (bytes) |
| --- | --- |
| 12.20 | 32 |
| 10.20 | 27 |
| 7.95 | 21 |
| 7.40 | 20 |
| 6.70 | 18 |
| 5.90 | 16 |
| 5.15 | 14 |
| 4.75 | 12 |
| SID | 5 |

TABLE 2

AMR-WB

| AMR-WB Speech Codec Mode (kbps) | RTP Payload Format Length Including Octet 0 (bytes) |
|---|---|
| 23.85 | 60 |
| 23.05 | 58 |
| 19.85 | 50 |
| 18.25 | 46 |
| 15.85 | 40 |
| 14.25 | 36 |
| 12.65 | 32 |
| 8.85 | 23 |
| 6.60 | 18 |
| SID | 6 |

As the RTP packet length varies, the IP packet size also varies, since the payload section of the IP packet contains the RTP packet. As a result, the peak throughput requirement changes with the codec rate. A higher codec rate, which implies a larger payload size, requires a higher peak throughput requirement. As a result, if a higher codec rate is used, then a higher bandwidth of a shared transport medium needs to be allocated.

One field of an IP header is a differentiated services (DS) field. In an IPv4 header, this field is referred to as a service type field. In an IPv6 header, this field is referred to as a traffic class field. The DS field is assigned a Diff-Serv code point (DSCP), which maps to a specific PHB (per-hop behavior) of routers that are part of the path along which the packet is transmitted. PHB denotes a combination of forwarding, classification, scheduling, and drop behaviors applied to a behavior aggregate (BA) at each hop (e.g., at each router that is a Diff-Serv-compliant node). A behavior aggregate is a collection of packets with the same DSCP crossing a link in a given direction. PHBs may be specified in terms of their resource (e.g., buffer, bandwidth, etc.) priority relative to other PHBs, or in terms of their relative observable traffic characteristics (e.g., delay, loss, etc.). By specifying plural DSCPs in the DS field carried in each IP packet, corresponding different PHBs (and thus different QoS requirements) can be specified. In accordance with some embodiments, the application 124 (FIG. 2) in each user device 100 sets a DSCP value in the DS field of an IP packet.

PHBs can be divided into different groups, referred to as PHB groups. A PHB group is a set of one or more PHBs that can be meaningfully specified and implemented simultaneously, due to a common constraint to all PHBs in the set, with an example of the constraint being queue servicing or queue management policy. Standardized PHB groups include a default PHB (DE PHB) group, which basically corresponds to best-effort QoS. In one embodiment, the default PHB is the best-effort forwarding behavior available in routers as standardized in RFC 1812, entitled "Requirements for IP Version 4 Routers," dated June 1995. The next higher level PHB group is a class selector PHB (CS PHB) group, which is described in RFC 2474, entitled "Definitions of the Differentiated Series Field (DS Field) in the IPv4 and IPv6 Header," dated December 1998. The next higher level PHB group is the assured forwarding PHB (AF PHB) group, described in RFC 2597, entitled "Assured Forwarding PHB Group," dated June 1999. The highest standardized PHB group is the expedited forwarding PHB (EF PHB) group, described in RFC 2598, entitled "An Expedited Forwarding PHB," dated June 1999.

In one example, DSCP values that are mapped to the various PHB groups are as follows. The DE PHB group is assigned a binary DSCP value of 00000000. The CS PHB group is assigned eight different DSCP values, referred to as CS0–CS7. The AF PHB group has 12 DSCP values, referred to as AFyx, where y equals 1–4, and x equals 1–3. The higher the y value, the higher the priority class, and the higher the x value, the higher the discard priority. The EF PHB group is mapped to a single DSCP value.

The various PHB groups can be mapped to the several QoS classes defined by UMTS: background, interactive, streaming and conversational. The background class can be mapped to the DE PHB group, the interactive class can be mapped to the CS PHB and/or AF PHB group; the streaming class can be mapped to the CS PHB and/or AF PHB group; and the conversational class can be mapped to the EF PHB group. However, according to one embodiment, it is noted that the EF PHB group is used for non-adaptive, constant-rate real-time packet-switched services (that is, voice communications that do not employ AMR codecs, but rather employ fixed rate codecs).

For adaptive multi-rate voice communications, a new PHB group is defined, which is referred to as the AMR PHB group according to some embodiments of the invention. The AMR PHB group includes 19 DSCP values, referred to as AMR1–AMR19. The DSCPs AMR1–AMR9 map to the 9 codec modes of the AMR-NB codec, while AMR10–AMR19 map to the 10 AMR-WB codec modes. AMR1 is mapped to the lowest codec rate of the AMR-NB codec (the SID rate), while AMR9 is mapped to the highest AMR-NB codec rate (12.20 kbps). AMR10 is mapped to the lowest AMR-WB codec rate (SID), while AMR19 is mapped to the highest AMR-WB codec rate (23.85 kbps).

Figure 3:
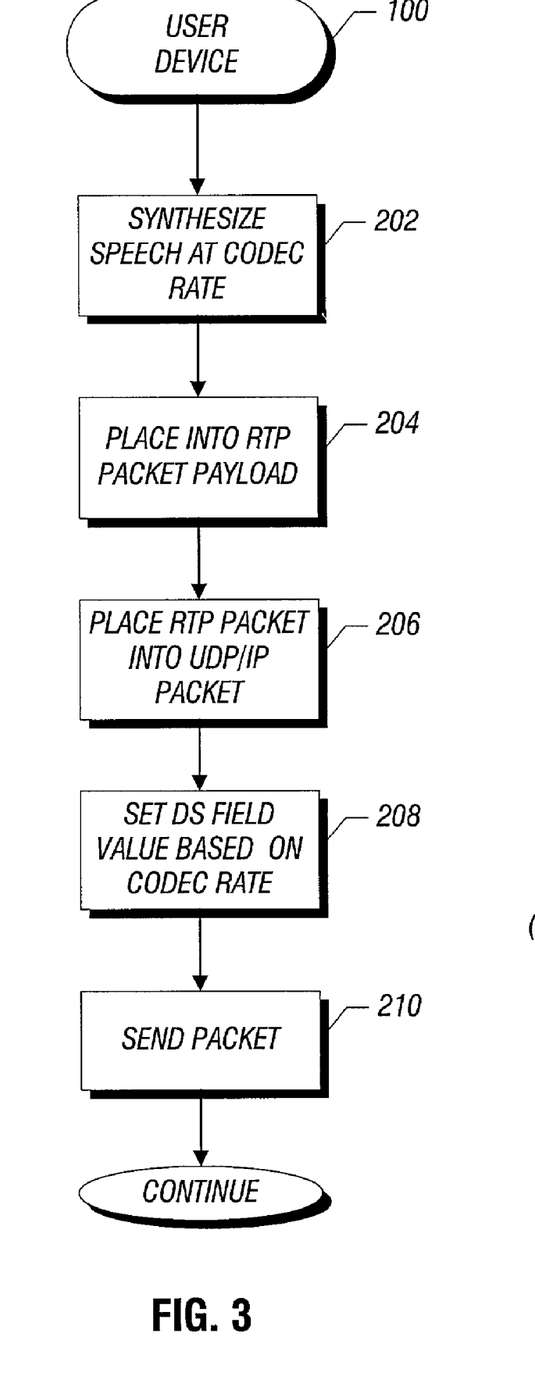
FIG. 3 is a flow diagram illustrating tasks performed by the user device of FIG. 1.

Referring to FIG. 3, a process performed by the user device 100 of FIG. 2 is illustrated. The AMR codec 116 synthesizes (at 202) speech at one of several codec rates. The synthesized speech is placed (at 204) into the payload section of an RTP packet by the RTP module 114. The RTP packet is then placed into a UDP/IP packet (at 206) by the UDP/IP layers 112 and 110. The application 124 then sets (at 208) the DS field value based on the codec rate. The DS field is set to one of the AMR DSCPs (AMR1–AMR19) based on which one of the codec rates is selected. The IP packet is then transmitted (at 210).

Figure 4:
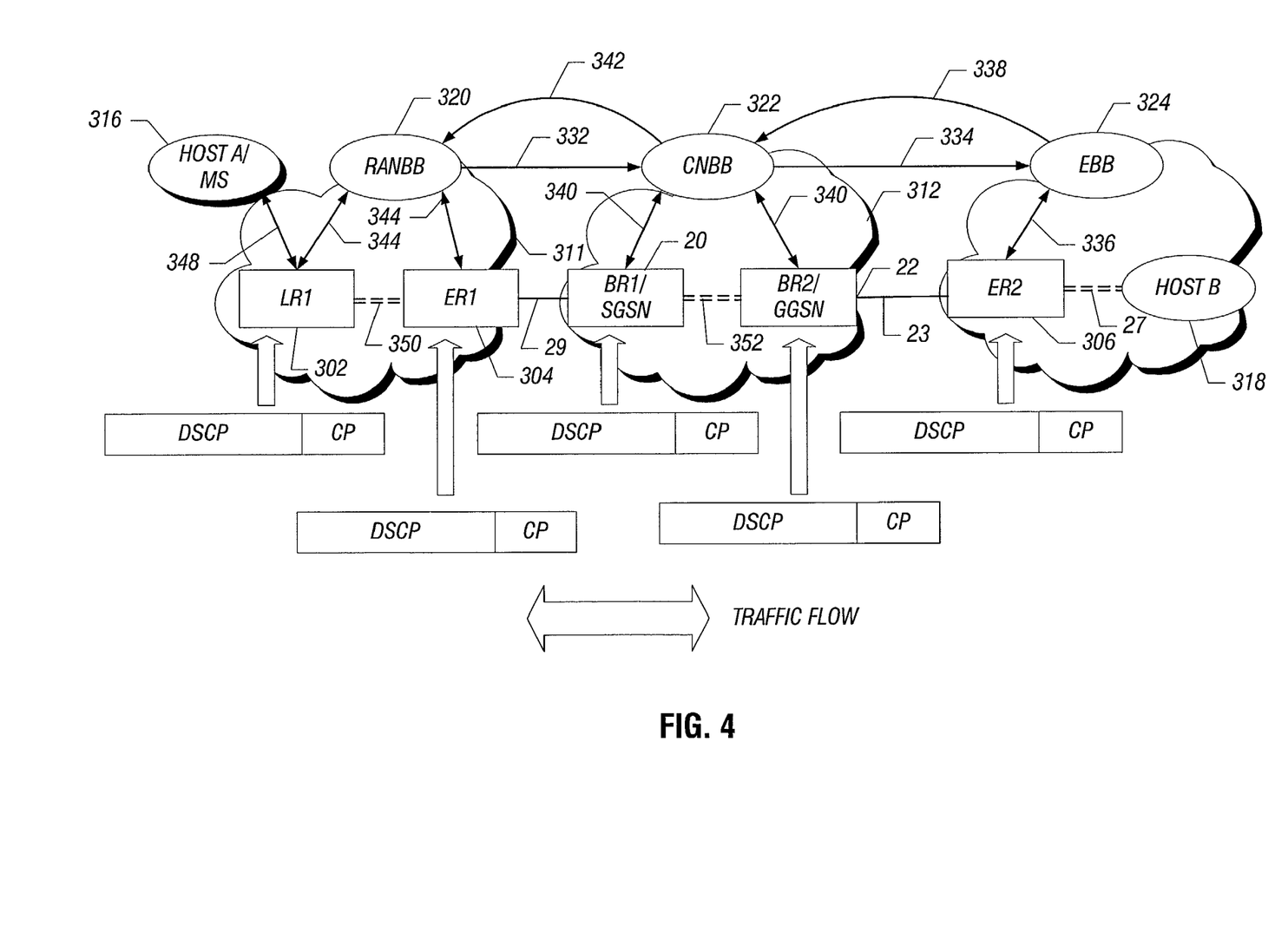
FIG. 4 illustrates a message flow between various entities in the communications network of FIG. 1.

Referring to FIG. 4, a message flow of various entities involved in a communication session is described. In the example, the first host (host A) 316 desires to establish a communications session with a second host (host B) 318. Host A can be a mobile station, while host B can be either a network telephone or a softphone coupled to a wired network (e.g., 24). In other examples, both hosts 316 and 318 can be mobile stations or stations coupled to a wired network. The communications session between host A and host B traverses a radio access network 311, a core network 312, and the external network 24. The core network 312 includes the SGSN 20 and the GGSN 22 (plus any other routers between the SGSN and GGSN). The SGSN 20 and GGSN 22 are referred to as border routers (BR1 and BR2). The radio access network 311 includes a local router 302 and an edge router 304. In one arrangement, the local router 302 can be implemented in the base station 14 (FIG. 1) and the edge router 304 can be implemented in the RAN controller 18. Other routers may be present between the local router 302 and edge router 304. The external network 24 includes an edge router 306, as well as other routers between the edge router 306 and host B. One characteristic of each of the routers 302, 304, 20, 22 and 306 (and any routers in between) is that they are DS-enabled; that is, these routers are capable of processing DS fields carried in IP packets. Also, in some embodiments, the routers (302, 304, 20, 22, and 306) are also capable of processing RSVP messages. Depending upon the external QoS signaling mechanism used (e.g., RSVP or some other messages), Service Level Agreements (SLAs) are put in place or agreed upon at 23 (between service providers).

A queue and scheduler mechanism 400 (FIG. 5) can be implemented in each of the routers 302, 304, 20, 22 and 306. In one embodiment, the queue and scheduler mechanism includes multiple input queues to receive different types of traffic. For example, traffic belonging to one PHB group is processed through a first set of one or more queues, while traffic belonging to another PHB group is processed through a second set of one or more queues.

Each queue can be implemented as a combined token bucket-leaky bucket queue. A token bucket receives traffic in an input queue, with output from the input queue controlled by a token bucket, which is associated with a depth of B bytes and a rate of R bytes/second. The output of the token bucket is forwarded to a leaky bucket, which has a predetermined depth and which can produce output data at a constant peak rate (P bytes/second).

An advantage of a token bucket is its ability to accommodate bursty traffic more efficiently, while an advantage of a leaky bucket is its ability to produce output data at a constant peak rate. If the peak rate P of the leaky bucket is greater than or equal to the token bucket rate R, then the average data rate from the combined token bucket-leaky bucket queue is R. The maximum burst size that can be handled by the queue is B. The queues for the different traffic streams may have different parameters R, B, and P.

The following example uses RSVP on the external signaling mechanism. Host A sends (at 348) an RSVP PATH message to the local router 302. The RSVP PATH message is used to discover the path or route to be used by the RTP packets. The local router 302 then confirms (at 344) with a radio access network bandwidth broker (RANBB) 320 whether or not to admit the path requested by host A. Communications between the local router 302 and RANBB 320 takes place using one of any number of standardized policy protocols, such as the Common Open Policy Service (COPS), described in RFC 2748 and 2753.

The PATH message includes Sender_Tspec information, which contains information about the traffic profile that is generated by the QoS-aware application in the host A. The information includes Peak_Rate, Token_Rate, Token_Bucket_Size, Max_SDU_Size, and so forth. The Sender_Tspec information defines the traffic characteristics of the data flow that the Sender is intending to generate. For example, for an RTP payload with AMR-NB, the parameter Peak_Rate is equal to Token_Rate, which equals 12.2 kbps plus overhead to reserve the appropriate amount of bandwidth for the highest codec rate for AMR-NB. If the AMR-NB codec rate changes later, then DSCP can be used to communicate the change in bandwidth requirement.

Alternatively, instead of using RSVP PATH message to reserve resources, an Activate PDP (Packet Data Protocol) Context message (see 3GPP TSG 24.007, "Mobile Radio Interface Signaling Layer 3; General Aspects") or other messages can be used instead to communicate the desired parameters, e.g., Token_Rate, Peak_Rate, Token_Bucket_Size, and so forth.

In response to the RSVP PATH message, the RANBB 320 makes a path admission control decision. If the request is denied, an error message (e.g., PATH Error) is sent back (at 348) to host A from local router 302. In that case, the signaling process ends. However, if the request is accepted by the RANBB 320, the local router 302 and edge router 304 send the RSVP PATH message to the border router (SGSN) 20. The SGSN 20 confirms (at 340) with a core network bandwidth broker (CNBB) 322, which is associated with the core network 312. The CNBB 322 makes a path admission control decision. In the event that a hard-state protocol instead of a soft-state protocol like RSVP is used, if the request is denied, the CNBB communicates its decision to the RANBB so as not to maintain the path state any longer than necessary. This could be done using some form of in-band signaling or any number of standardized policy protocols, such as COPS, described in RFC 2748 and 2753.

If the request is denied, an error message (e.g., PATH Error) is sent back to the edge router 304 and local router 302, which then inform host A of the path admission control decision by the CNBB 322. If the request is accepted, the border router 20 and border router 22 send (at 23) the RSVP PATH message to an edge router 306. The edge router 306 confirms with an external bandwidth broker (EBB) 32 whether or not to admit the path requested by host A. In the event that a hard-state protocol instead of a soft-state protocol like RSVP is used, if the request is denied, the EBB communicates (using some form of in-band signaling or signaling according to a standardized policy protocol such as COPS) its decision (at 338) to CNBB 322 so as not to maintain the path state any longer than necessary.

Assuming that the request is accepted, the edge router 306 sends (at 27) the RSVP PATH message to host B. Otherwise, a PATH Error message is returned to host A. Host B then sends (at 27) an RSVP RESV message to the edge router 306. Once the path state for the RTP packets is installed along the data path with the RSVP PATH message, the RSVP RESV message is used to make the actual reservation request. The RESV message contains Flow_Spec information, including R_Spec and Receiver_Tspec. R_Spec contains information about the QoS requirements for the traffic described in Receiver_Tspec. Receiver_Tspec is created by copying the information from the Sender_Tspec information in the PATH message.

The edge router 306 then confirms (at 336) with the EBB 324 whether or not to admit the reservation requested by host B. Communications between the edge router 306 and EBB 324 can be according to COPS. Alternatively, instead of using RSVP RESV, an Activate PDP Context Accept message, or another message, can be used instead.

In response to the RSVP RESV message, the EBB 324 makes a reservation admission control decision. If the request is denied, an RESV Error message is sent back to host B. In that case, the signaling process ends. However, if the request is accepted by the EBB 324, the EBB 324 allocates the requested resources and sends (at 23) the RSVP RESV message to the border router 22. The border router 22 then confirms (at 340) with the CNBB 322 whether or not to admit the reservation that has been requested by host B. In the event that a hard-state protocol instead of a soft-state protocol like RSVP is used, if the request is denied, the CNBB 322 communicates its decision (at 334) to EBB 324 so as not to maintain the reservation state any longer than necessary.

If the request is denied, an RESV Error message is sent back to the edge router 306, which then informs host B of the reservation admission control decision made by the CNBB 322. If the request is accepted, the CNBB 322 allocates the requested resources, and the border routers 20 and 22 send (at 29) the RSVP RESV message to the edge router 304. The edge router 304 confirms (at 344) with the RANBB 320 whether or not to admit the reservation requested by host B. In the event that a hard-state protocol instead of a soft-state protocol like RSVP is used, if the request is denied, the RANBB 320 communicates its decision (at 332) to CNBB 322 so as not to maintain the reservation state any longer than necessary.

Assuming that the request is accepted, the RANBB 320 allocates the requested resources and the edge router 304 and local router 302 sends the RSVP RESV message (at 348) to host A. Otherwise, an RESV Error message is returned to host B.

Upon receiving the RSVP RESV message, host A can start transmitting RTP packets with the appropriate DSCP set to correspond to the AMR-NB or AMR-WB codec rate used on a per-speech frame basis. Host A sends packets (at 348) to the local router 302. If the packets are non-conformant (or out of profile), the local router 302 shapes the packets to make them conformant. The packets are sent through any intermediate routers (at 350) to the edge router 304, which also performs classification and reshaping of the traffic as necessary to ensure that the negotiated peak rate is not exceeded.

The functions of the routers 302, 20 and 306 (on the uplink) and 306, 22 and 304 (on the downlink) is to (1) classify traffic, (2) meter traffic, (3) mark traffic, (4) shape traffic, and (5) drop traffic. A classifier is a mechanism used to select the appropriate PHB for a traffic flow. The main purpose of a meter is to sort the classified packets into the correct urgency (U), importance (I), and bandwidth (B) levels. Packet marking (that is, setting and remarking the DSCP) maps packets into one of the available U, I, and B levels of the PHB used by the traffic flow. The basic idea behind traffic shaping is that if it has been determined that a packet should be re-marked (that is, if it has been determined that the DSCP should be changed) to a lower U, I, and/or B level, an alternative might be to shape the traffic process in such a way that re-marking (or dropping) is not necessary.

Figure 5:
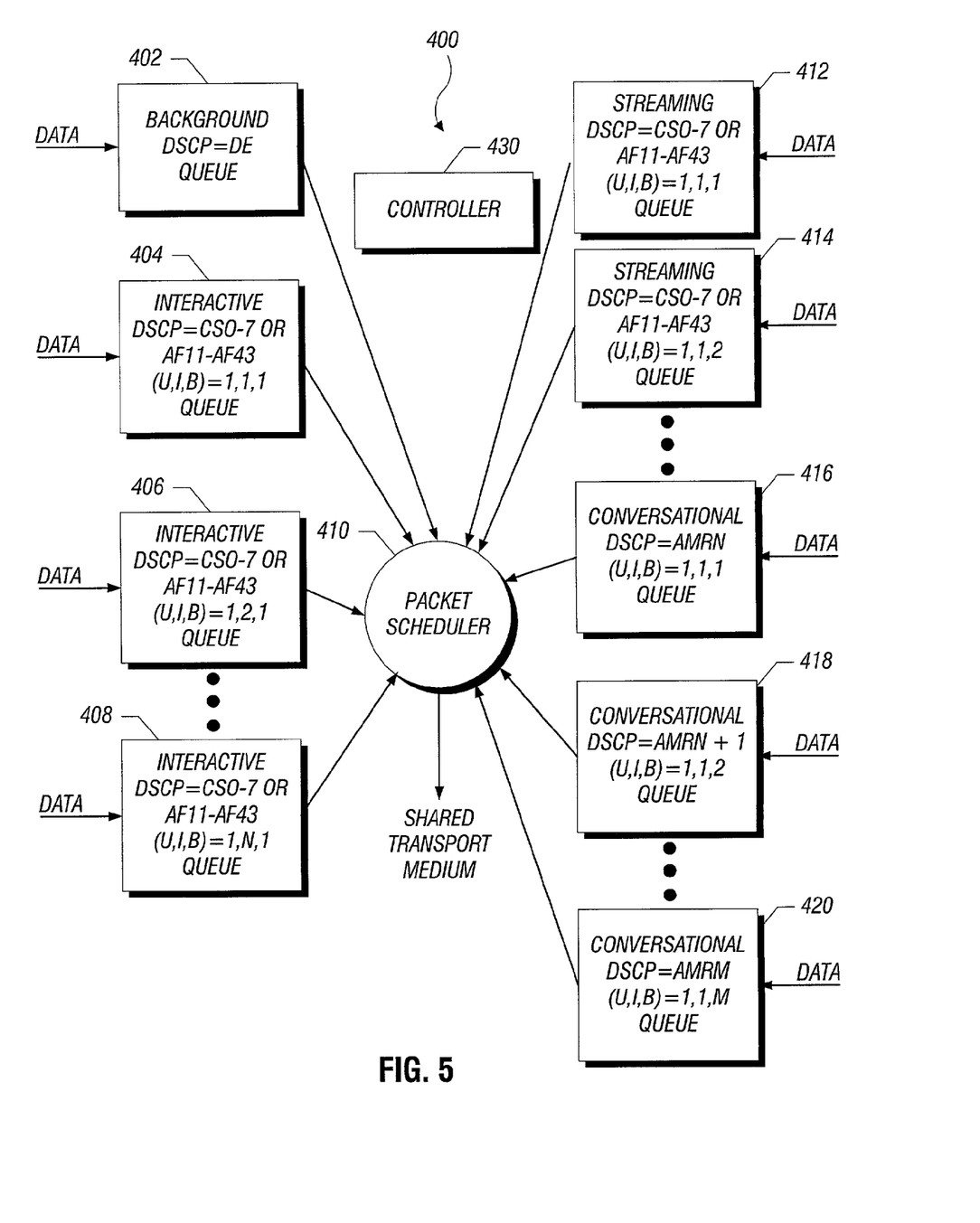
FIG. 5 is a block diagram of a scheduling and queuing mechanism for use in one or more nodes in the communications network of FIG. 1.

Upon receiving the RTP packets with appropriate DSCP set to correspond to the AMR-NB or AMR-WB codec rate, all of the routers 302, 20 and 306 (on the uplink) and 306, 22, and 304 (on the downlink) examine the DSCP to select the appropriate PHB (which is realized by the queue mechanism of FIG. 5).

Referring to FIG. 5, the queue and scheduler mechanism 400 that can be used in each of the routers of FIG. 4 is illustrated. The mechanism 400 includes queues 402, 404, 406, 408, 412, 414, 416, 418, and 420. The packet scheduler 410 selects data from one of the queues to output to a shared transport medium. In the example of FIG. 5, the queue 402 is used for traffic in the background class, the queues 404, 406, and 408 are used for traffic in the interactive class, the queues 412 and 414 are used for traffic in the streaming class, and the queues 416, 418, and 420 are used for traffic in the conversational class. A controller 430 (which can be software, hardware, or both) performs various control functions, including selection of one of the queues to place data to be transported. Also, the controller 430 is able to dynamically create the queues on an as-needed basis.

As discussed above, the DSCP value DE maps to the background class. DSCP values CS014 CS7 and/or AF1–AF43 are mapped to the interactive and streaming classes. Thus, in one example, the queue 404 can receive traffic associated with DSCP values in a first subgroup of the DSCP values {CS0–7, AF11–AF43}; the queue 406 receives traffic associated with DSCP values in a second subgroup of the DSCP values {CS0–7, AF11–AF43}, and so forth for queues 408, 412, and 414.

Figure 6:
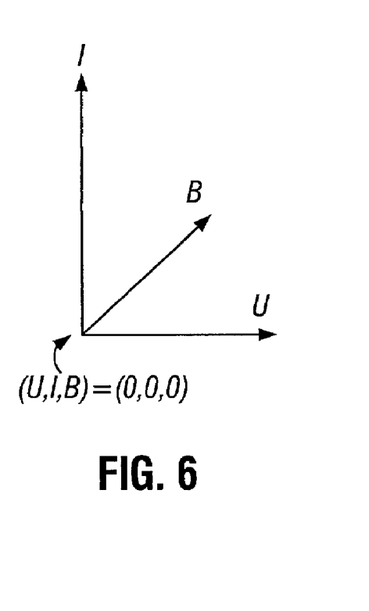
FIG. 6 illustrates a coordinate system to represent importance (I), urgency (U), and bandwidth (B).

The subgroups can be identified by the following parameters (U, I, B), where U represents urgency, I represents importance, and B represents bandwidth (see FIG. 6 for an illustration of the coordinate system representation). Urgency refers to the delay tolerance of a packet, importance refers to the priority of the packet, and bandwidth refers to the peak throughput requirement of the packet. Thus, in the example of FIG. 5, the queue 404 is associated with DSCP values in the subgroup identified as (U, I, B)=(1, 1, 1) in the interactive class; the queue 406 is associated with DSCP values in the subgroup identified as (U, I, B)=(1, 2, 1) in the interactive class; the queue 408 is associated with DSCP values in the subgroup identified as (U, I, B)=(1, N, 1) in the interactive class; the queue 412 is associated with DSCP values in the subgroup identified as (U, I, B)=(1, 1, 1) in the streaming class; and so forth.

The queues 416, 418 and 420 receive data associated with DSCP values AMR1–AMR9 for the AMR-NB codec and AMR10–AMR19 for the AMR-WB codec. The queues 416–420 are assigned the highest priority by the packet scheduler 410. The queues associated with the streaming class, interactive class, and background class are assigned priorities in descending order by the packet scheduler 410. Thus, if data is present in any of the queues 416–420, then the data in those queues will be selected first for transmission on the shared transport medium by the packet scheduler 410.

The packet scheduler 410 can use various algorithms to select data from the queues. One example algorithm is the weighted-fair queuing (WFQ) algorithm. One example of the WFQ algorithm is described in A. Demers et al., "Analysis and Simulation of a Fair Queuing Algorithm," Journal of Internetworking Research and Experience, pp. 3–26 (1990). The packet scheduler 410 selects data to output from the queues based on the DSCP values of the packets. Thus, for example, if the WFQ algorithm is used by the packet scheduler 410, then weights assigned to data in each of the queues is based on the DSCP values of packets that are waiting in the queues. Thus, as audio codec rates drop, which means that the DSCP values decrease from AMRM down to AMR N+1 or AMRN, the packet scheduler 410 is able to more quickly accommodate other types of traffic according to their predefined PHB weights (in the background, interactive or streaming queues). By dropping the DSCP values (and thus peak throughput requirements) for traffic in the conversational class, greater bandwidth is made available to the other types of traffic.

This effectively provides "statistical multiplexing" of conversational class traffic and other lower priority traffic. Without the ability to vary DSCP values with varying codec rates, the EF PHB group DSCP value would have to be used, which specifies the maximum QoS requirement needed for conversational class traffic. Specifying the maximum QoS requirement for conversational traffic even as the codec rate drops causes unnecessary resources to be reserved. However, by varying the DSCP values with varying codec rates according to some embodiments of the invention, a portion of the resources that would otherwise have been allocated for conversational class traffic can be used for other types of traffic (e.g., best-effort traffic, interactive traffic, or streaming traffic). To enable the use of DSCPs for different AMR codec rates, nine new DSCPs can be reserved from the Internet Assigned Numbers Authority (IANA) for the AMR-NB codec and ten new DSCPs can be reserved from IANA for the AMR-WB codec.

The various nodes and systems discussed each includes various software routines or modules. Such software routines or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage devices. The instructions when executed by a respective control unit cause the corresponding node or system to perform programmed acts.

The instructions of the software routines or modules are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of communications, comprising:
    determining one of plural rates to code data for communication over a network;
    encapsulating the data in an Internet Protocol (IP) packet having a quality-of-service indicator field; and
    setting one of plural differentiated services code points for the quality-of-service indicator field based on the determined one of plural rates.

2. The method of claim 1, wherein setting one of plural differentiated services code points for the quality-of-service field comprises:
    setting a first differentiated services code point for the quality-of-service indicator field in the Internet Protocol packet if a first rate is determined; and
    setting a second differentiated services code point for the quality-of-service indicator field in the Internet Protocol packet if a second rate is determined.

3. The method of claim 1, wherein determining one of plural rates comprises determining one of plural rates of an adaptive multi-rate codec.

4. The method of claim 1, wherein the quality-of-service indicator field comprises a differentiated services field.

5. The method of claim 1, wherein determining one of plural rates to code data comprises determining one of plural rates to code real-time data.

6. The method of claim 1, wherein determining one of plural rates to code data comprises determining one of plural rates to code audio data.

7. A method of communications, comprising:
    determining one of plural rates to code data for communication over a network;
    encapsulating the data in an Internet Protocol (IP) packet having a quality-of-service indicator field;
    setting one of plural differentiated services code points for the quality-of-service indicator field in the IP packet based on the determined one of plural rates; and
    transmitting the packet over a wireless link.

8. An article comprising at least one storage medium comprising instructions that when executed cause a system to:
    determine one of plural rates to code data for communication over a network; and
    set one of plural quality-of-service values in an Internet Protocol packet, based on the determined one rate, to carry the data over the network, wherein setting one of the plural quality-of-service values comprises setting one of plural differentiated services code points.

9. The article of claim 8, wherein the instructions when executed cause the system to determine one of plural rates by determining one of plural rates of an adaptive multi-rate codec.

10. The article of claim 8, wherein the instructions when executed cause the system to set one of the plural quality-of-service values in a differentiated services field in the Internet Protocol packet.

11. The article of claim 8, wherein the instructions when executed cause the system to determine one of plural rates to code one of audio data and video data.

12. A system comprising:
    a codec adapted to code real-time data;
    a controller adapted to vary a codec rate and to set one of plural quality-of-service indicator values in an Internet Protocol (IP) packet based on the codec rate, the plural quality-of-service indicator values comprising differentiated services code points; and
    an interface to a wireless link to communicate the IP packet.

13. A system comprising:
    a codec adapted to code real-time data; and
    a controller adapted to vary a codec rate and to set one of plural quality-of-service indicator values in a quality-of-service field of an Internet Protocol packet based on the codec rate, the plural quality-of-service indicator values comprising differentiated services code points.

14. The system of claim 13, wherein the codec comprises an adaptive multi-rate codec.

15. The system of claim 13, wherein the controller comprises application software to set the one of plural quality-of-service indicator values.

16. The system of claim 15, further comprising a network layer to encapsulate the data in a packet to carry the one quality-of-service indicator value.

17. The system of claim 16, wherein the network layer comprises an Internet Protocol layer.

18. The system of claim 13, further comprising a Real-Time Protocol module adapted to encapsulate the real-time data in a Real-Time Protocol packet.

19. A system comprising:
   a network interface to receive plural Internet Protocol (IP) packets from a network;
   a plurality of queues to store the IP packets, each IP packet containing a quality-of-service indicator, the plural IP packets containing different quality-of-service indicator values that correspond to different coding rates, the quality-of-service indicator values comprising differentiated services code points; and
   a controller adapted to store each IP packet in one of the plurality of queues based on the quality-of-service indicator value in the IP packet.

20. The system of claim 19, wherein the IP packets contain conversational data.

21. The system of claim 19, wherein the coding rates comprise rates of an adaptive multi-rate codec.

* * * * *